US009354842B2

(12) United States Patent
Koo et al.

(10) Patent No.: US 9,354,842 B2
(45) Date of Patent: May 31, 2016

(54) APPARATUS AND METHOD OF CONTROLLING VOICE INPUT IN ELECTRONIC DEVICE SUPPORTING VOICE RECOGNITION

(71) Applicant: Samsung Electronics Co., Ltd., Gyeonggi-do (KR)

(72) Inventors: Youngdae Koo, Seoul (KR); Taehyung Kim, Gyeonggi-do (KR); Howon Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/341,001

(22) Filed: Jul. 25, 2014

(65) Prior Publication Data
US 2015/0032457 A1 Jan. 29, 2015

(30) Foreign Application Priority Data

Jul. 25, 2013 (KR) ........................ 10-2013-0088254

(51) Int. Cl.
*G10L 15/00* (2013.01)
*G10L 25/48* (2013.01)
*G06F 3/16* (2006.01)

(52) U.S. Cl.
CPC ................ *G06F 3/167* (2013.01); *G06F 3/165* (2013.01); *G10L 15/00* (2013.01)

(58) Field of Classification Search
CPC . H04M 1/0266; H04M 1/575; H04M 1/6016; H04M 1/6075; H04M 2250/02
USPC .......................................................... 704/275
See application file for complete search history.

(56) References Cited

U.S. PATENT DOCUMENTS

| 7,369,997 | B2 | 5/2008 | Chambers et al. |
| 8,294,683 | B2 | 10/2012 | Ranford et al. |
| 2006/0200354 | A1* | 9/2006 | Ito et al. ........................ 704/275 |
| 2008/0240568 | A1 | 10/2008 | Tonouchi |
| 2010/0318366 | A1 | 12/2010 | Sullivan et al. |

* cited by examiner

*Primary Examiner* — Charlotte M Baker
(74) *Attorney, Agent, or Firm* — The Farrell Law Firm, P.C.

(57) ABSTRACT

A method of controlling a voice input of a terminal supporting a voice recognition function is provided. The method includes controlling a microphone to be in a turn-off state during operation of a voice recognition mode; detecting a first user input for requesting turn-on of the microphone based on at least one of a touch input, a touch pen input, and a key input; controlling the microphone in the turn-off state to be in a turn-on state when the first user input is detected; collecting voice input data of a user through the microphone in the turn-on state; and controlling the microphone in the turn-on state to be in the turn-off state when a second user input for requesting the turn-off of the microphone is detected, and terminating collecting the voice input data.

14 Claims, 8 Drawing Sheets

US 9,354,842 B2

APPARATUS AND METHOD OF CONTROLLING VOICE INPUT IN ELECTRONIC DEVICE SUPPORTING VOICE RECOGNITION

PRIORITY

This application claims priority under 35 U.S.C. §119(a) to Korean Patent Application No. 10-2013-0088254, filed in the Korean Intellectual Property Office on Jul. 25, 2013, the entire content of which is incorporated herein by reference.

BACKGROUND

1. Field of the Invention

The present invention generally relates to an apparatus and a method of controlling a voice input which controls a start and an end of the voice input in an electronic device supporting voice recognition.

2. Description of the Related Art

Recently, as communication technology has developed, electronic devices, such as smart phones and tablet Personal Computers (PCs), have become popular. Specifically, a portable terminal among the electronic devices is convenient by allowing it to be used across a broad spectrum of fields. Recently, the terminals have adopted voice recognition technology for replacing a physical input and allowing the terminal to be used more conveniently. The voice recognition technology may be implemented in various electronic devices which contain a voice input device, for example, a microphone. The voice recognition technology statistically analyzes and discriminates a voice input through the input device.

Accordingly, when the terminal in the related art is operated in a voice recognition mode, the terminal automatically operates a microphone for collecting a voice signal, collects the voice signal from the microphone, performs a calculation based on the collected voice signal, and recognizes the voice. That is, the terminal automatically operates the microphone and is operated in a state where the terminal 100 waits for a voice input. There is a disadvantage in that the microphone is maintained in a turn-on state regardless of articulation of a user when the terminal executes a voice recognition function in the related art. There is also a problem in that noise, other than a voice of a user, is collected, and power is consumed according to the operation of the microphone.

Further, in the voice recognition technology, it is important to minimize noise or a silent section of a recorded voice signal in order to accurately recognize a voice. However, in the terminal in the related art, the microphone is maintained in the turn-on state regardless of articulation of a user, so that there is a problem in that noise other than a voice of a user may be included in the voice signal, and it is difficult to accurately recognize a voice articulation start and end time.

SUMMARY

The present invention has been made to solve at least the above problems and/or disadvantages and to provide at least the advantages below. Accordingly, an aspect of the present invention is to provide a method and an apparatus for controlling a voice input which operate a voice input device only in a user demanded situation to allow the user to input a voice.

Another aspect of the present invention is to provide a method and an apparatus for controlling a voice input, which control a turn-on/turn-off operation state of a voice input device by using at least one of a touch input, a touch pen input, and a key input, thereby accurately recognizing an articulation start and end time of a user.

In accordance with an aspect of the present invention, a method of controlling a voice input of a terminal supporting a voice recognition function is provided. The method includes controlling a microphone to be in a turn-off state during operation of a voice recognition mode; detecting a first user input for requesting turn-on of the microphone based on at least one of a touch input, a touch pen input, and a key input; controlling the microphone in the turn-off state to be in a turn-on state when the first user input is detected; collecting voice input data of a user through the microphone in the turn-on state; and controlling the microphone in the turn-on state to be in the turn-off state when a second user input for requesting the turn-off of the microphone is detected, and terminating collecting the voice input data.

In accordance with another aspect of the present invention, a terminal for supporting a voice recognition function is provided. The terminal includes a display unit configured to display a voice recognition operation screen image, and to display an execution object supporting a function of controlling turn-on and turn-off of a microphone; an input unit configured to generate at least one of a touch input, a touch pen input, and a key input; a microphone configured to collect a voice signal; and a controller configured to control the microphone to be in a turn-off state during operation of a voice recognition mode, to detect a first user input for requesting turn-on of the microphone based on at least one of the touch input, the touch pen input, and the key input from the input unit, to control the microphone in the turn-off state to be in a turn-on state when the first user input is detected, to collect voice input data of a user through the microphone in the turn-on state, to control the microphone in the turn-on state to be in the turn-off state when a second user input for requesting the turn-off of the microphone is detected, and to terminate collecting the voice input data.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
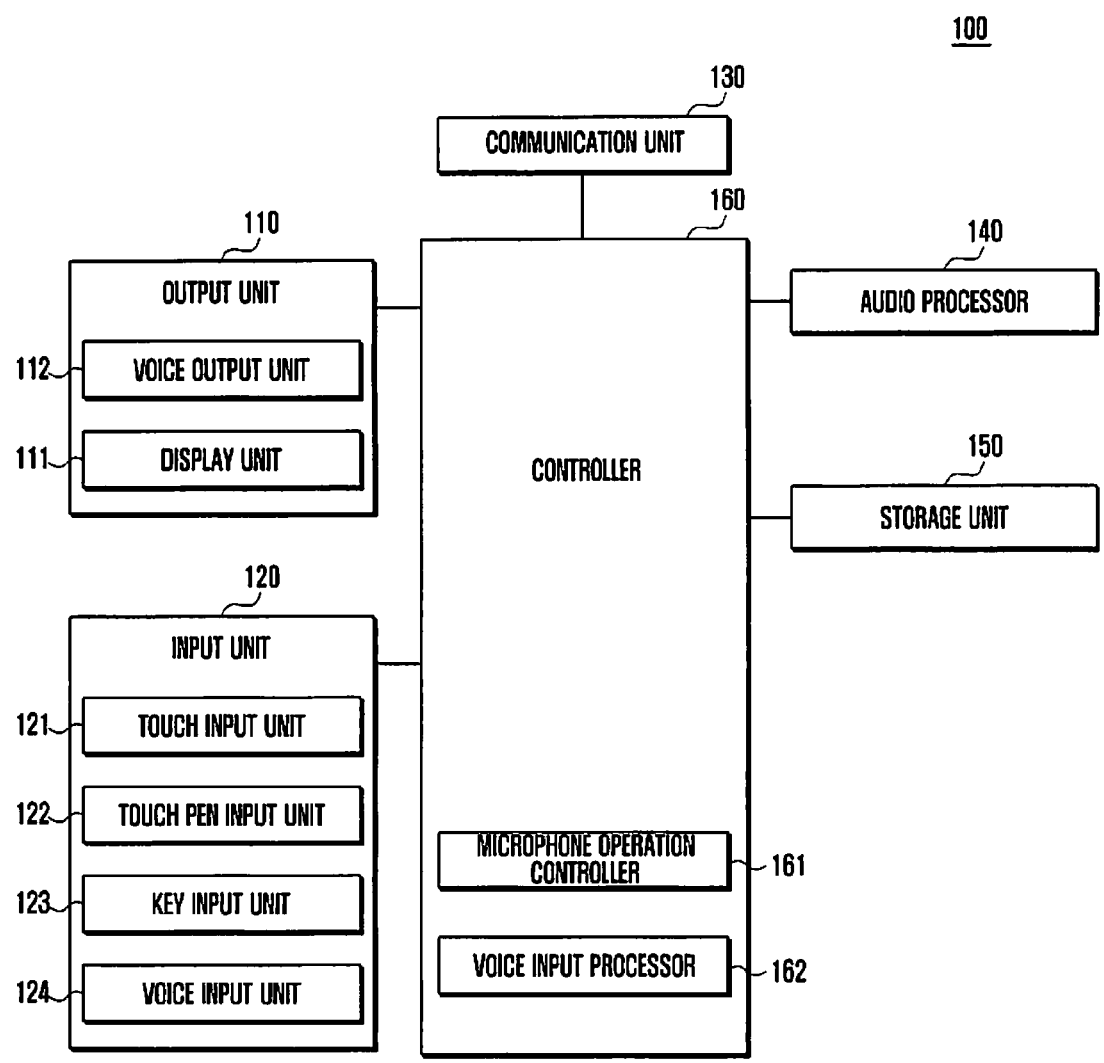
FIG. 1 is a block diagram schematically illustrating a configuration of a terminal according to an embodiment of the present invention.

Hereinafter, an apparatus and a method of controlling voice input according to embodiments of the present invention will be described in detail with reference to the accompanying drawings. Prior to making a detailed description of the present invention, the terms and words used in the present specification and claims should not be interpreted as being limited to their typical meaning based on the dictionary definitions thereof, but should be interpreted to have the meaning and concept relevant to the technical spirit of the present invention. Accordingly, the embodiments described in the present specification and constructions shown in the drawings of the present invention do not represent all technical spirits of the present invention. Therefore, it should be understood that various equivalents and modified embodiments capable of replacing these embodiments may exist at the time when this application was filed. Also, in the accompanying drawings, some elements are enlarged, omitted, or schematically illustrated, and the size of each element does not entirely reflect an actual size. Accordingly, in the present invention, the relative size of the elements illustrated in the accompanying drawings is not restricted by an interval.

The method and the apparatus according to the present invention may be applied to all of the electronic devices supporting a voice recognition function. It is apparent that the electronic device may include a portable phone, a smart phone, a tablet Personal Computer (PC), a hand-held PC, a Portable Multimedia Player (PMP), a Personal Digital Assistant (PDA), a vehicle navigation device, a music file player, a portable game terminal, and the like. Hereinafter, the description below is given based on an assumption that the method of controlling a voice input, and the apparatus supporting the same according to the present invention are applied to a portable terminal.

The terminal according to the present invention supports the turn-on/turn-off of a voice input device to be selected according to a user input in a voice recognition mode, thereby permitting a voice to be input according to the intention of the user. Accordingly, the terminal of the present invention minimizes generation of an unnecessary noise, and improves accuracy and a speed of voice recognition by accurately recognizing an articulation time of a user. Further, the terminal of the present invention may prevent an error in voice recognition and improve user convenience by efficiently using the voice input device.

FIG. 1 is a block diagram illustrating a configuration of a terminal according to an embodiment of the present invention.

Referring to FIG. 1, a terminal 100 according to the present invention supports a microphone operation control function to be selectable by a user input. Here, the microphone operation control function means a function of controlling the microphone to be in a turn-on state or a turn-off state by the user input.

The terminal 100 includes an output unit 110, an input unit 120, a communication unit 130, an audio processor 140, a storage unit 150, and a controller 160.

The output unit 110 outputs image data and voice data related to an operation of a voice input function. The output unit 110 includes a display unit 111 for displaying image data, and a voice output unit 112 for outputting voice data in the form of a sound.

The display unit 111 displays various function images related to the operation of the voice input function. Under the control of the control unit 160, the display unit 111 converts image data received from the control unit 160, into an analog signal, and displays the converted analog signal. The display unit 111 may include a display panel for providing various screen images according to the operation of the terminal. The display unit 111 provides the screen image of the voice recognition function operation with turn-on and turn-off information (for example, an icon or a message) about the voice input device. Here, at least one application (hereinafter, an "app") execution screen image supporting the voice recognition function may be defined as the screen image of the voice recognition function operation. For example, when an app supporting the voice recognition function is executed, the display unit 111 displays an icon indicating that the microphone is in the turn-off state, and when the turn-off state of the microphone is changed to the turn-on state by the user input, the display unit 111 displays an icon indicating that the microphone is in the turn-on state under the control of the controller. Embodiments about the screen image of the voice recognition function operation and the user input will be described in detail below with reference to the accompanying drawings.

The voice output unit 112 includes a speaker SPK, and outputs various audio data related to the voice input function operation in the form of a sound. The voice output unit 112 outputs audio data, which has been digital-to-analog (D/A) converted by the audio processor 140, under the control of the controller 160. The voice output unit 112 outputs an effect sound according to the voice recognition function operation. For example, the voice output unit 112 outputs voice data according to the turn-on state or the turn-off state of the microphone in the voice recognition mode under the control of the controller.

The input unit 120 generates various input signals necessary for user settings, the voice recognition function, and a control function of the voice input device, and transmits the generated various input signals to the controller 160. The controller 160 controls functions mapped to a corresponding input signal in response to the input signal.

The input unit 120 includes at least one of a touch input unit 121, a touch pen input unit 122, a key input unit 123, and a voice input unit 124. The input unit 120 supports the turn-on state and the turn-off state of the voice input unit to be controlled by using an input signal generated from at least one of the touch input unit 121, the touch pen input unit 122, and the key input unit 123.

The touch input unit 121 is an input unit for generating various touch event based on a touch panel. Specifically, the touch input unit 121 generates an analog signal (for example, a touch event) in response to user input information (for example, a touch gesture) for the touch panel, analog-to-digital (A/D) converts the analog signal, and transmits the A/D-converted signal to the controller 160. Here, the analog signal includes information about touch coordinates (X, Y). The touch input unit 121 may be implemented by an add-on type, in which the touch input unit 121 is positioned on a front surface of the display unit 111, or an on-cell type or an in-cell type, in which the touch input unit 121 is inserted inside the display unit 111.

The touch pen input unit 122 provides an input means for generating a touch pen input event based on a touch pen recognition panel. The touch pen input unit 122 receives a position value of a touch pen according to an approach of the touch pen or a manipulation of the touch pen, and gesture recognition information according to an operation of the touch pen, and transmits the received position value and gesture recognition information to the controller 160. For example, when the touch pen is configured by an electromagnetic induction scheme, the touch pen input unit 122 collects an electromagnetic induction value corresponding to each corresponding interval according to an approach interval of the touch pen, and transmits the collected electronic device induction value to the controller 160. The touch pen input unit 122 generates at least one input between a touch contact input and a hovering input of the touch pen. When the touch pen input unit 122 is configured by design schemes other than the electromagnetic induction scheme, the touch pen input unit 122 may be designed in a structure of receiving information about a corresponding touch pen, but is not limited thereto. Here, the touch pen input unit 122 may be omitted depending on the type of the terminal.

The key input unit 123 provides an input means for generating a key input event based on a direction key, a side key, a shortcut key, and the like, set to perform a specific function. The key input unit 123 generates a key signal related to the user settings and the control of the function of the terminal, and transmits the generated key signal to the controller. The key signal may be divided into a power on/off signal, a volume control signal, a screen on/off signal, and the like.

The voice input unit 124 includes the microphone MIC, and provides an input means for collecting the voice signal collected from the microphone. The voice input unit 124 is controlled to be in the turn-off state by the controller 160 in the voice recognition mode, is controlled to be in the turn-on state in response to an input signal of the user, and records a user voice collected through the microphone. The voice input unit 124 supports the recorded voice to be transmitted to the controller 160, and the recorded voice to be recognized.

When the terminal is operated in the voice recognition mode, the touch input unit 121, the touch pen input unit 122, and the key input unit 123 may be utilized as an input means for generating an on/off signal in order to determine the turn-on/turn-off state of the voice input unit.

The communication unit 130 performs a communication function of the terminal. The communication unit 130 establishes a communication channel with a mobile communication network, which is capable of being supported by the communication unit 130, and performs communication functions, such as voice communication, image communication, and data communication. The communication unit 130 may include a Radio Frequency (RF) transmitter for up-converting and amplifying a frequency of a signal to be transmitted, an RF receiver for low-noise amplifying a received signal and down-converting a frequency of the received signal, and the like.

When a specific server supports the voice recognition function, the communication unit 130 supports the voice recognition function through the network communication with the specific server. For example, the terminal transmits voice data collected through the microphone to the specific server through the communication unit 130. The specific server calculates and analyzes the voice data received from the terminal, recognizes the voice, and transmits information about the recognized voice to the communication unit 130. The communication unit 130 may transmit the information about the recognized voice to the controller 160, and the controller 160 may perform the voice recognition function based on the information about the recognized voice.

The audio processor 140 D/A converts audio data, such as the voice, received from the controller 160 and transmits the D/A-converted audio data to the speaker SPK, and A/D converts the audio data, such as the voice, received from the microphone MIC and transmits the A/D-converted audio data to the controller 160. The audio processor 140 may include a codec (coder/decoder). The codec may include a data codec for processing packet data and the like, and an audio codec for processing an audio signal, such as a voice. The audio processor 140 converts the received digital audio signal into an analog signal through the audio codec, and reproduces the converted analog signal through the speaker. The audio processor 140 converts the analog audio signal input from the microphone to the digital audio signal through the audio codec, and transmits the converted digital audio signal to the controller 160.

When the microphone is operated by the user input in the voice recognition mode, the audio processor 140 collects the voice signal of the user and processes the collected voice signal. Further, the audio processor 140 processes information in response to the voice of the user to be output through the speaker according to the execution of a specific function. Further, the audio processor 140 receives an external sound signal through the microphone and processes the received sound signal to electrical voice data in a call mode, a recording mode, or the voice recognition mode. The audio processor 140 may be implemented by various noise removing algorithms for removing noise generated during the process of receiving a voice.

The storage unit 150 stores one or more applications necessary for the operation of the function of the terminal 100, user data generated by the user, a message transceived through the network, data according to the execution of the application, and the like. The storage unit 150 may generally include a program region and a data region.

The program region stores an Operating System (OS) for booting the terminal 100 and operating each of the aforementioned elements, downloaded and installed applications, and the like. Specifically, the program region stores a voice recognition operation program. The voice recognition operation program supports the function of the terminal 100 to be performed by using the voice recognition. When the voice recognition operation program determines that one of predetermined voice commands is input with a voice based on a result of the voice recognition, the voice recognition operation program includes a routine for executing a corresponding function.

The data region is a region in which data generated according to the use of the terminal 100 is stored. Data used or generated during execution of the voice recognition application program is stored in the data region. Various statistical models, the voice recognition result, and the like, for the voice recognition may be stored in connection with the voice recognition operation program in the data region.

The controller 160 controls a general operation of the terminal 100. The controller 160 determines whether a user input for determining the turn-on/turn-off of the microphone is detected when operating the terminal 100 in the voice recognition mode, and controls the operation of the microphone in response to the user input.

The controller 160 includes a microphone operation controller 161 and a voice input processor 162. The microphone operation controller 161 supports a function of setting a user input option for controlling the turn-on/turn-off of the microphone, and a function of controlling the microphone to be in the turn-on/turn-off state based on the user input. Specifically, when an app supporting the voice recognition function is executed, the microphone operation controller 161 controls the microphone to be in the turn-off state. For example, when the terminal 100 is operated in the voice recognition mode, the microphone operation controller 161 determines whether at least one input signal from the touch input, the touch pen input, and the key input pre-defined for the control of the turn-on/turn-off of the microphone is detected. When the corresponding input signal is detected, the microphone operation controller 161 controls the microphone to be turned on or turned off in response to the corresponding input signal.

The voice input processor 162 includes an automatic speech recognition module for recognizing the speech of the user input through the microphone. The automatic speech recognition module extracts a characteristic of the received voice, compares the extracted characteristic with voice model data, and analyzes the voice. The automatic speech recognition module may analyze a characteristic of a frequency of the voice by Fast Fourier Transform (FFT) to form voice data, or analyze a characteristic of a waveform of the voice to form voice data. The automatic speech recognition module converts the voice data into one or more pattern matched numbers or letters to form a character. Further, the automatic speech recognition module may output execution information according to execution of a function in response to the function, which is executed by recognizing the voice, in the form of a voice through the speaker according to a pre-defined rule. The automatic speech recognition module may be implemented as an external server in which data communication connection is established by a communication module, instead of being implemented inside the terminal 100.

A digital device may be variously changed according to a convergence trend thereof, so that all of the elements of the digital device may not be enumerated, but the portable terminal 100 according to the present invention may further include elements, which have not been mentioned above, such as a Global Positioning System (GPS) and a camera module. Also, a particular configuration of the portable terminal 100 may be excluded from the above-described configuration or may be replaced by another configuration according to embodiments of the present invention.

Figure 2:
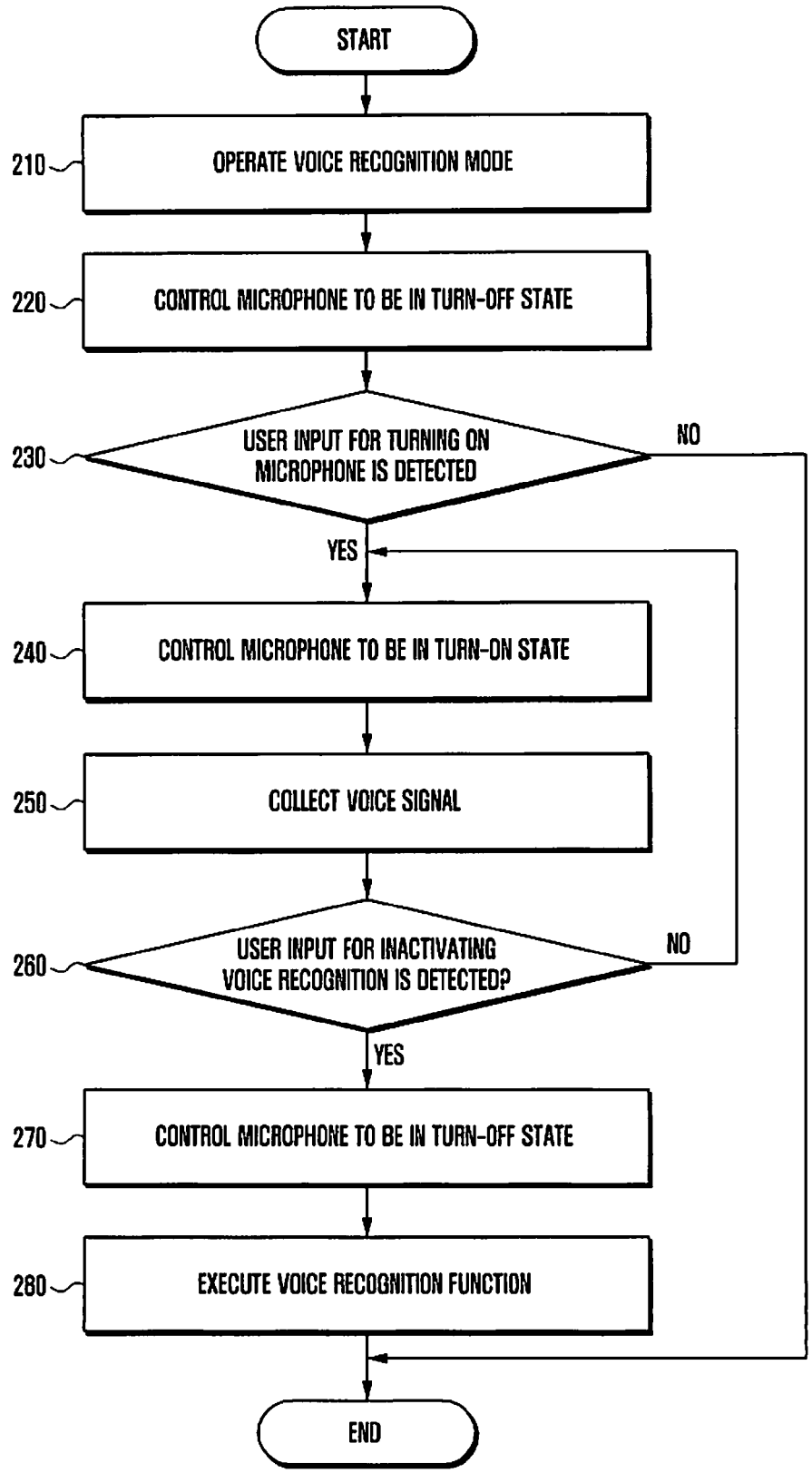
FIG. 2 is a flowchart for describing a method of controlling a voice input according to an embodiment of the present invention.

FIG. 2 is a flowchart for describing a method of controlling a voice input in the terminal 100 according to an embodiment of the present invention.

Referring to FIG. 2, the terminal 100 is operated in the voice recognition mode according to a user input event to directly or indirectly activate the voice recognition mode or a predetermined schedule in step 210. Here, when an app supporting the voice recognition function is executed, the voice recognition mode is indirectly activated, and thus, the terminal 100 may be operated in the voice recognition mode. The app supporting the voice recognition function may control corresponding functions with a voice in connection with one or more functions provided by the terminal 100. The terminal 100 may include a voice model DataBase (DB) corresponding to execution of detailed functions of the app supporting the voice recognition function.

In this process, the terminal 100 may display an execution screen image of the app supporting the voice recognition function on the display unit 111. Specifically, the terminal 100 may support the execution screen image of the app supporting the voice recognition function to be output in a full mode, or the information (for example, an icon or a message) about the voice recognition function indicating that the terminal 100 is operated in the voice recognition mode to be output in a predetermined area of a screen of the display unit 111. Here, the information about the voice recognition function may be configured as an execution object supporting the turn-on/turn-off function of the microphone. The execution object may be a menu icon for executing the voice recognition function. Further, the terminal 100 of the present invention may support the information about the voice recognition function to be graphically processed differently and output according to the turn-on/turn off state of the microphone.

In step 220, when the terminal 100 is operated in the voice recognition mode, the terminal 100 controls the microphone to be turned off. In this process, the terminal 100 may output an inactivation icon (for example, a message) indicating that the microphone is in the turn-off state on the display unit 111. The terminal 100 may also output voice information notifying that the microphone is in the turn-off state.

Thus, the terminal 100 of the present invention is operated in the voice recognition mode, and supports the function of controlling the microphone to be turned off, not to be automatically turned on.

The terminal 100 determines whether a user input requesting execution of the turn-on of the microphone is detected in step 230. Here, the user input requesting execution of the turn-on of the microphone includes at least one of an input signal of touching the inactivation icon, an input signal of tapping the inactivation icon, an input signal of maintaining the touch pen for a predetermined amount of time, a button event input signal of the touch pen, and a key input signal.

When the user input requesting execution of the turn-on of the microphone is detected, the terminal 100 controls the microphone to be in a turn-on state in response to the user input in step 240. In this process, the terminal 100 may output an activation icon (for example, a message) indicating that the microphone is in the turn-on state on the display unit 111 so that the user may recognize that the microphone is currently operated through the activation icon output on the screen. When the user input requesting execution of the turn-on of the microphone is not detected, the microphone is controlled to be not turned on, so the terminal 100 may be operated in a state where voice input is not allowed.

The terminal 100 may control the turn-on state of the microphone according to various user inputs in accordance with a characteristic of an app. For example, the terminal 100 may control the microphone to be turned on once the user touches the inactivation icon, control the microphone to be turned on until a predetermined amount of time elapses after the inactivation icon is tapped, control the microphone to be turned on after the screen is touched with the touch pen for a predetermined amount of time, and control the microphone to be turned on once an input signal of a button event of the touch pen is received, which are not limited thereto, and may control the turn-on/turn-off state of the microphone by using various input signals.

The terminal 100 collects a voice signal collected through the microphone in step 250. The terminal 100 determines whether a user input requesting execution of the turn-off of the microphone (i.e., inactivation of voice recognition) is detected during the collection of the voice signal in step 260. Here, the user input requesting execution of the turn-off of the microphone includes at least one of an input signal of touching the activation icon, an input signal of releasing the activation icon after maintaining the press of the activation icon for a predetermined amount of time, an input signal in which the touch pen is maintained for a predetermined amount of time, a button event input signal of the touch pen, and a key input signal.

The user input requesting the execution of the turn-on/turn-off of the microphone may be changed according to the characteristic of the app, and may be set by a user for each app supporting the voice recognition function or set during the manufacturing of the terminal 100. The terminal 100 of the present invention may support the control of the operation of the microphone to be set for each app by the user. When the user's setting is input during the setting of the control of the operation of the microphone, the terminal 100 may also support a function of determining a characteristic of an app supporting the voice recognition function, and differently set a microphone operation control input condition according to the characteristic of the app. The microphone operation control setting will be described with reference to FIG. 8.

When the user input requesting execution of the turn-off of the microphone is detected, the terminal 100 controls the microphone to be in the turn-off state in response to the user input in step 270. In this process, the terminal 100 may output a microphone inactivation icon (for example, a message) indicating that the microphone is in the turn-off state on the display unit 111.

The terminal 100 recognizes the voice based on the voice signal collected when the microphone is in the turn-on state, and executes the voice recognition function in response to the voice signal in step 280. For example, the terminal 100 modulates the voice signal received from the microphone into a digital signal by using a codec, and extracts voice data from the digital signal output from the codec. Next, the terminal 100 Speech-To-Text (STT) converts the extracted voice data, compares the converted text with a voice model or text patterns stored in the storage unit 150 to recognize the voice input. In this process, the terminal 100 may execute a predefined function in response to the recognized voice input. When the terminal 100 fails to recognize the voice as a result of the comparison of the voice data received through the microphone, the terminal 100 may output voice recognition error information on the display unit, or output voice recognition error information in the form of a voice through the speaker.

As described above, the terminal 100 according to the present invention may determine an articulation start time and an articulation end time according to the intention of the user. For example, the user may control the microphone to be turned on by pressing the inactivation icon before the articulation, and control the microphone to be turned off by pressing the inactivation icon just before the articulation end. Accordingly, the terminal 100 of the present invention controls the microphone to be operated only while the user input is detected, to minimize generation of noise and improve accuracy in the voice recognition.

Figure 3:
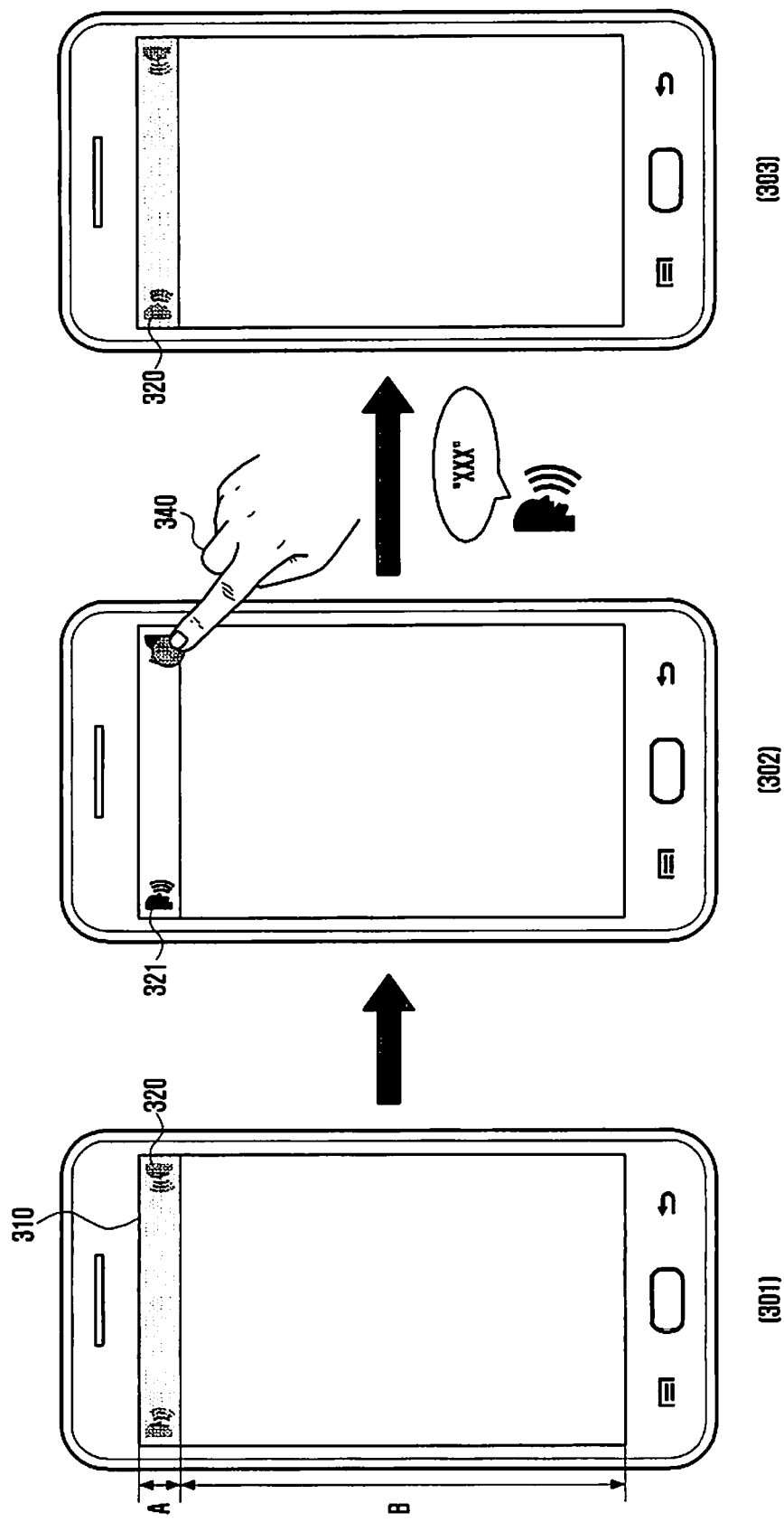
FIG. 3 is a diagram illustrating an example of a screen in which a microphone operation is controlled according to a first embodiment of the present invention.

FIG. 3 is a diagram illustrating an example of a screen in which a microphone operation is controlled according to a first embodiment of the present invention.

Referring to FIG. 3, the terminal 100 of the present invention controls the microphone for inputting a voice to be turned on and operated while a user touches a predetermined icon.

Specifically, the terminal 100 operates in the voice recognition mode according to a user's request and/or a predetermined schedule. Here, the display unit 111 displays an app screen image 310 supporting the voice recognition function on an entire screen of the display unit 111 as illustrated in image 301 under the control of the controller 160. The app screen image 310 includes a first area A for displaying the execution screen image of the app, and a second area B for displaying information about the voice recognition function. The screen of the display unit 111 is divided into the second area B and the first area A so that the second area B may be displayed separately with the first area A, or the second area B may overlay the first area A to be output on the first area A, but is not limited thereto. Further, the second area B may be designed to be included in an app screen image during a process of designing the app supporting the voice recognition function, but the second area may be designed to be output on the screen image of the app supporting the voice recognition function under the control of the terminal 100.

The terminal 100 of the present invention first controls the microphone to be turned-off in the voice recognition mode, and then is operated in a state of waiting for an input of the user. During the microphone being turned-off, the terminal 100 may output information (for example, the inactivation icon 320) indicating that the microphone is currently controlled in the turn-off state on the app screen image 310. Here, the inactivation icon 320 may be output at a right side or a left side of an upper end of the display unit 111 as illustrated in image 301, but is not limited thereto, and may be output in a specific region of the display unit. The terminal 100 may also simultaneously output the inactivation icon 320 on the app screen image 310 and a voice "please turn on the microphone" through the speaker. The user may recognize that the microphone is currently controlled in the turned-off state through the inactivation icon 320.

The user may then press the inactivation icon 320 for allowing the voice input according to the intention of the user as illustrated in image 302. The terminal 100 detects a press event of selecting the inactivation icon, and controls the turn-off state of the microphone to be in the turn-on state in response to the detected press event. The press event may be an input event of selecting one of the inactivation icons output at the left or right upper side. Here, the icon controlling the turn-on/turn-off of the microphone may be disposed at both sides of the display unit for easy use of a touch input tool (for example, a hand of the user) during the articulation of the user.

When the microphone is turned on and being operated, the terminal 100 outputs an activation icon 321 indicating that the microphone is currently controlled in the turn-on state on the app screen image 310. The user may recognize that the microphone is in the turn-on state through the icon, and speak for the voice input. When the microphone is operated and the user speaks, the terminal 100 collects a user voice signal collected through the microphone.

When the user intends to terminate the voice input, the user releases the press of the screen. Then, the terminal 100 controls the turn-on state of the microphone to be the turn-off state in response to the release event as illustrated in image 303. When the microphone is controlled to be in the turn-off state, the terminal 100 determines a time of the control of the microphone to be in the turn-off state as an articulation end time, calculates and analyzes the voice signal collected through the microphone, and performs the voice recognition function.

Figure 4:
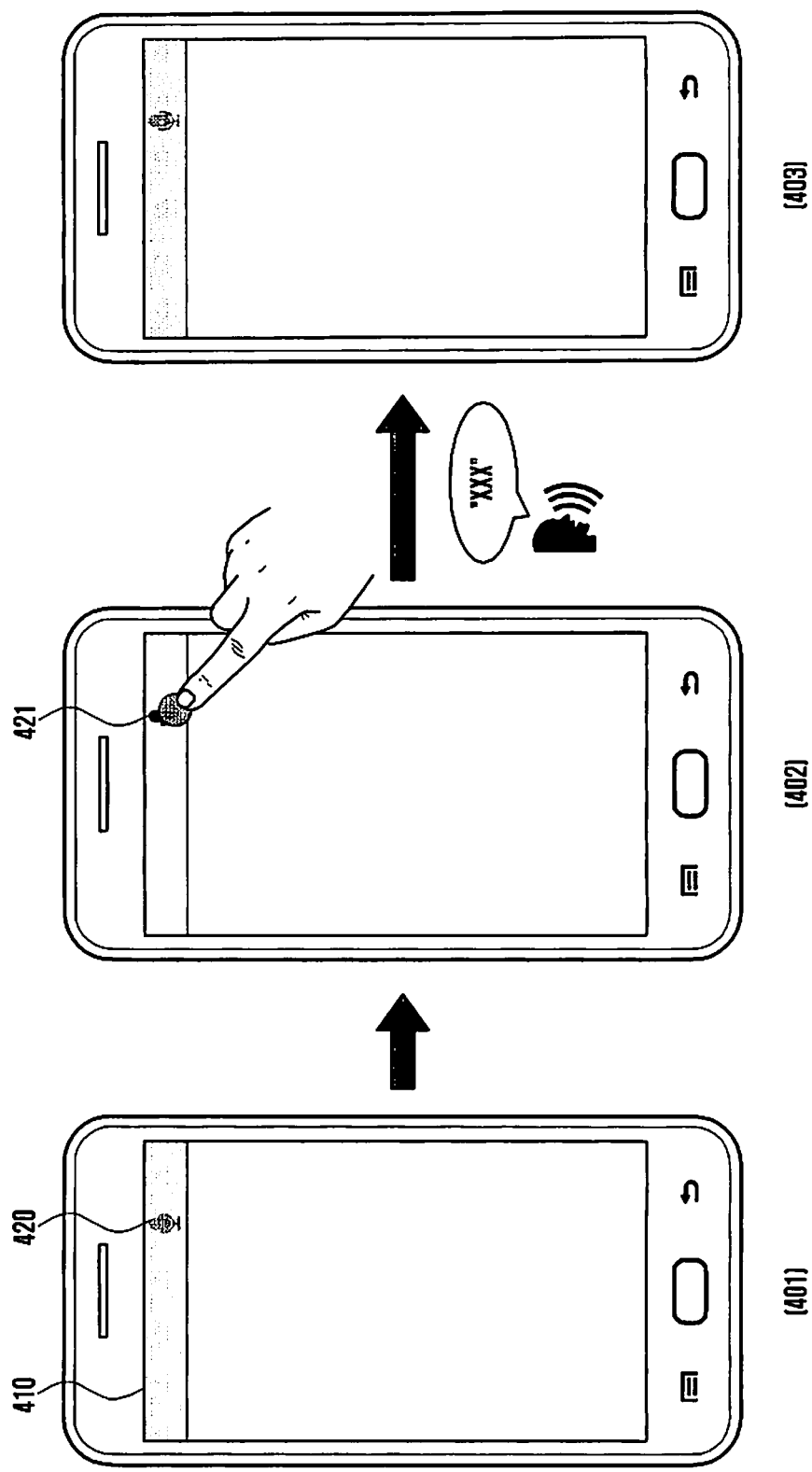
FIG. 4 is a diagram illustrating an example of a screen in which a microphone operation is controlled according to a second embodiment of the present invention.

FIG. 4 is a diagram illustrating an example of a screen in which a microphone operation is controlled according to a second embodiment of the present invention.

Referring to FIG. 4, the terminal 100 controls the microphone for the voice input to be turned on for a predetermined time after the user touches or taps a predetermined icon.

Specifically, the terminal 100 displays a screen image 410 of an app supporting the voice recognition function on the display unit according to a user's request and/or a predetermined schedule as illustrated in image 401. A description of screen image 401 is the same as that of screen image 301 of FIG. 3, so that the detailed description thereof will be omitted. The terminal 100 of the present invention first controls the microphone to be turned-off in the voice recognition mode, and is then operated in a state of waiting for an input of the user. As illustrated in FIG. 4, when the app supporting the voice recognition function is executed, the display unit 111 displays voice recognition mode information under the control of the controller 160. The display unit 111 may output an inactivation icon 420 indicating that the microphone is currently controlled in the turn-off state.

The user may touch (or tap) the inactivation icon 420 output on the screen image 410 of the app in order to allow an voice input as illustrated in image 402. The terminal 100 controls the turn-off state of the microphone to be in the turn-on state in response to the touch (or tap). The terminal 100 may control the microphone to be maintained in the turn-on state from a time, at which the user inputs the touch, until a predetermined amount of time passes. Here, the predetermined amount of time may correspond to a time set by the user according to a microphone operation control setting function, or a time set as a default during the manufacturing of the terminal 100.

The terminal 100 collects a voice signal of the user through the microphone for a predetermined amount of time starting from a turn-on time of the microphone, and when the predetermined amount of time elapses, the terminal 100 automatically controls the microphone to be in the turn-off state as illustrated in image 403. That is, when a predetermined amount of time starting from the turn-on time of the microphone elapses, the terminal 100 determines the time as an articulation end time, calculates and analyzes the voice signal collected through the microphone, and performs the voice recognition function.

When the user first touches (or taps) a predetermined icon, the terminal 100 of the present invention may control the microphone to be turned-on, and when the user second touches (or taps) a predetermined icon in the turn-on state of the microphone, the terminal 100 may control the microphone to be turned-off. The terminal 100 may recognize that the user input detected during the turn-off of the microphone corresponds to an articulation start time, and the user input detected during the turn-on of the microphone corresponds to an articulation end time.

Figure 5:
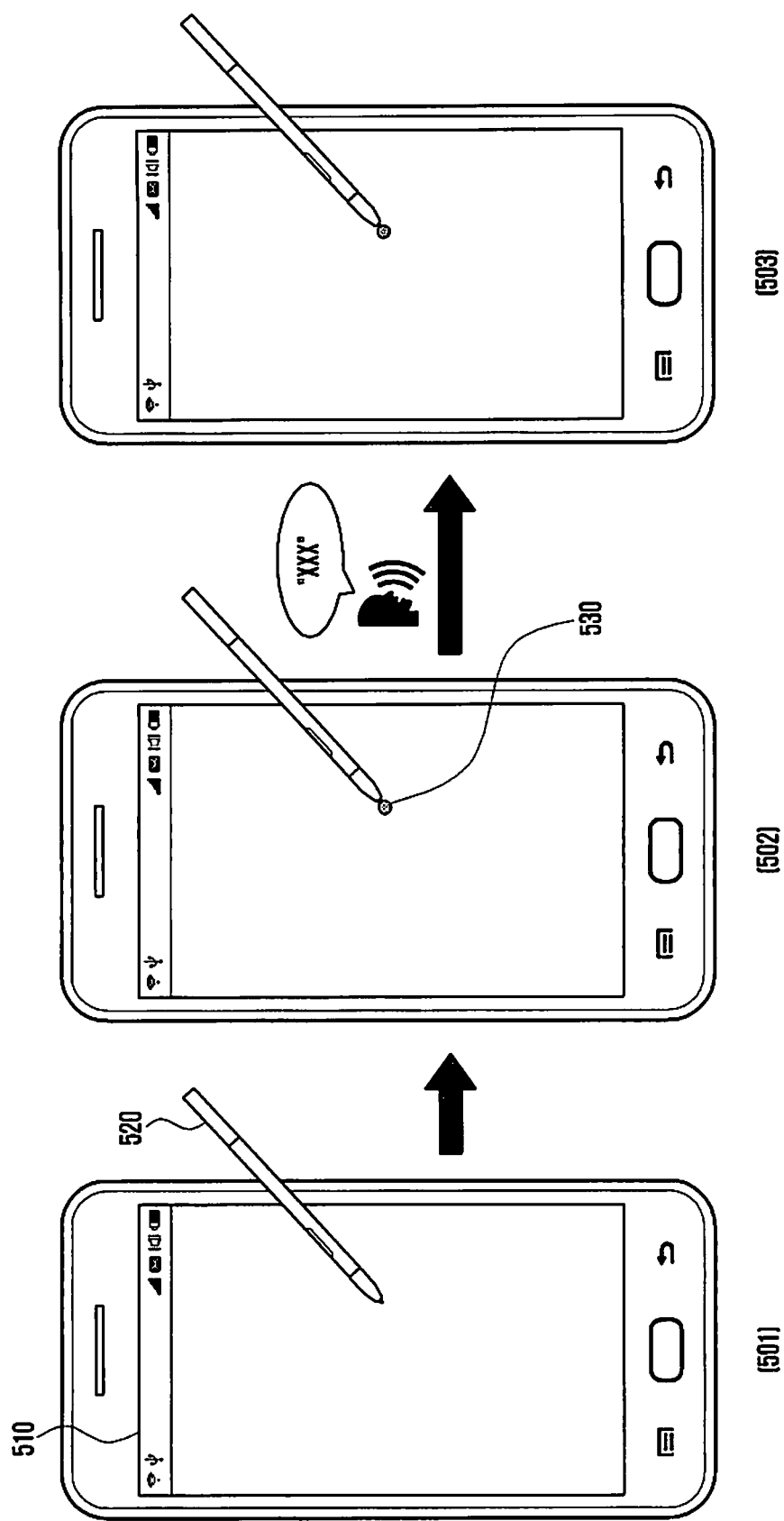
FIG. 5 is a diagram illustrating an example of a screen in which a microphone operation is controlled according to a third embodiment of the present invention.

FIG. 5 is a diagram illustrating an example of a screen in which a microphone operation is controlled according to a third embodiment of the present invention.

Referring to FIG. 5, the terminal 100, which supports a touch pen input function by recognizing a touch pen, supports a function of controlling the turn-on and turn-off of the microphone according to a touch pen input signal.

The display unit 111 displays a screen image 510 of an app supporting touch pen recognition on the display unit 111 under the control of the controller 160 as illustrated in image 501. The screen image of the app supporting the touch pen recognition may be displayed on a full screen. The terminal 100 may control a touch pen panel to be in an activation state so that a touch pen input can be recognized. The app supporting the touch pen recognition recognizes the touch pen and controls at least one function based on the touch pen input.

The user may perform a pre-defined input operation in order to turn on the microphone during the operation of the app supporting the touch pen recognition.

For example, the user performs a motion (for example, a long press) that maintains a touch input for a predetermined amount of time in any one state of a state where the touch pen is in contact with the touch panel or a hovering state. The terminal 100 then turns on the microphone in response to the operation for turning on the microphone and is operated in the voice recognition mode as illustrated in image 502. Upon the turn-on of the microphone, the terminal 100 may collect a voice of the user from the microphone. Although not illustrated, the display unit 111 may also display information indicating that the microphone is turned on, so that the user is informed that the terminal 100 is currently operating in the voice recognition mode.

After the user ends the voice input, the user may perform a predetermined input motion for turning off the microphone as illustrated in image 503. Here, the motion predetermined for turning off the microphone may be the same as the motion for turning on the microphone.

When the motion of maintaining the touch pen input for a predetermined amount of time is detected in the turn-on state of the microphone, the terminal 100 controls the turn-on state of the microphone to be the turn-off state, and executes the voice recognition function based on the voice signal of the user collected in the turn-on state of the microphone. When the display unit first displays information that the terminal 100 is currently operated in the voice recognition mode, and then the microphone is turned off in image 503, the display unit limits the display of the corresponding information.

Figure 6:
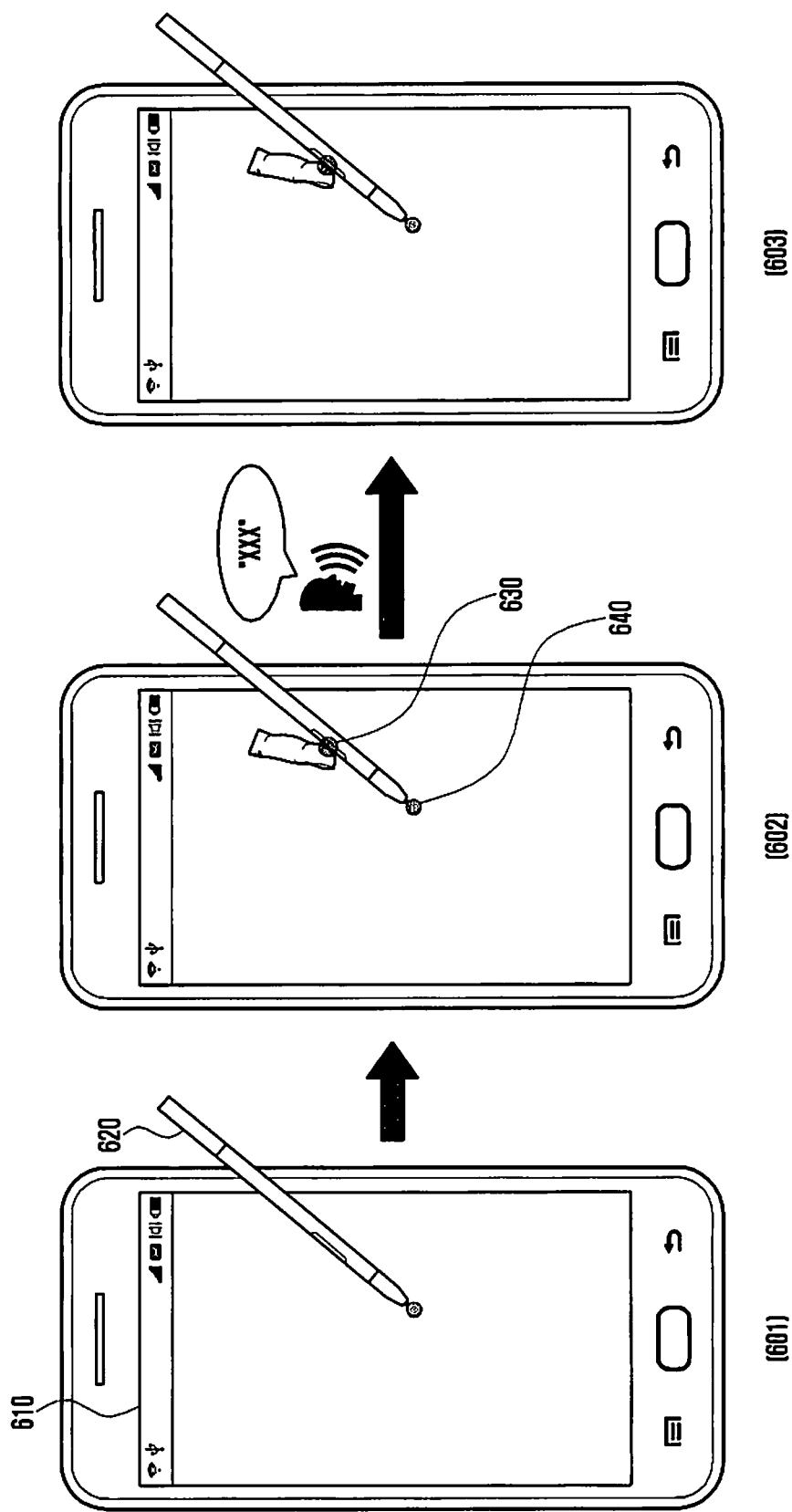
FIG. 6 is a diagram illustrating an example of a screen in which a microphone operation is controlled according to a fourth embodiment of the present invention.

FIG. 6 is a diagram illustrating an example of a screen in which a microphone operation is controlled according to a fourth embodiment of the present invention.

Referring to FIG. 6, the terminal 100, which supports a touch pen input function by recognizing a touch pen, supports a function of controlling the turn-on and turn-off of the microphone according to a button input signal of the touch pen.

The display unit 111 displays a screen image 610 of an app supporting touch pen recognition on the display unit 111 under the control of the controller 160 as illustrated in image 601. The screen image of the app supporting the touch pen recognition may be displayed on a full screen. The terminal 100 may control a touch pen panel to be in an activation state so that touch pen input can be recognized. The user may perform an input of selecting a button provided at the touch pen in order to turn on the microphone during the operation of the app supporting the touch pen recognition.

The terminal 100 then turns on the microphone in response to a button input event of the touch pen and is operated in the voice recognition mode as illustrated in image 602. Upon the turn-on of the microphone, the terminal 100 may collect a voice of the user from the microphone. Although not illustrated, the display unit 111 may also display information indicating that the microphone is turned on, so that the user is informed that the terminal 100 is currently operating in the voice recognition mode.

After the user ends the voice input, the user may perform an input of selecting the button provided on the touch pen in order to turn off the microphone as illustrated in image 603. When the button input event of the touch pen is detected in the turn-on state of the microphone, the terminal 100 controls the turn-on state of the microphone to be the turn-off state, and executes the voice recognition function based on the voice signal of the user collected in the turn-on state of the microphone. When the display unit first displays information that the terminal 100 is currently operated in the voice recognition mode, and then the microphone is turned off in image 602, the display unit limits the display of the corresponding information.

Figure 7:
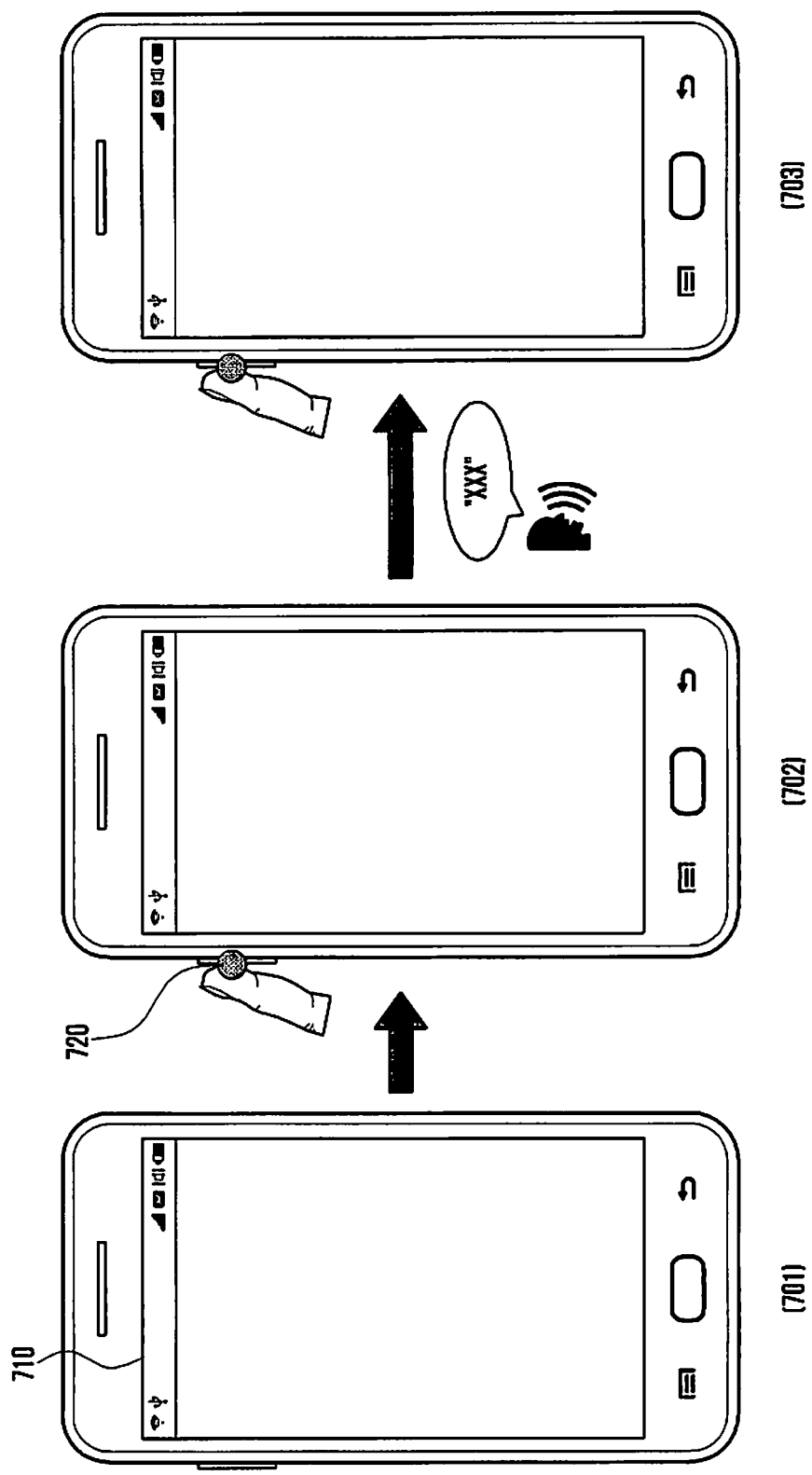
FIG. 7 is a diagram illustrating an example of a screen in which a microphone operation is controlled according to a fifth embodiment of the present invention.

FIG. 7 is a diagram illustrating an example of a screen in which a microphone operation is controlled according to a fifth embodiment of the present invention.

Referring to FIG. 7, the terminal 100 supports the function of controlling the turn-on and turn-off of the microphone according to an input signal of the key input unit.

The terminal 100 of the present invention may display various operation screen images in order to operate functions supportable by the terminal 100 as illustrated in image 701. When a predetermined key input signal for turning on the microphone is detected during the operation of the terminal 100, the terminal 100 according to the present invention supports the microphone to be turned on in response to the detected key input signal so that the terminal 100 is operated in the voice recognition mode.

For example, as illustrated in image 702, the user may maintain a press of a side key in a state where the app supporting the voice recognition function is executed for a predetermined amount of time. The terminal 100 determines that an input event of the key input unit is an input predetermined for turning on the microphone, turns on the microphone, and then is operated in the voice recognition mode. Upon the turn-on of the microphone, the terminal 100 collects a voice of the user from the microphone. Although not illustrated, the display unit 111 may also display information indicating that the microphone is turned on, so that the user is informed that the terminal 100 is currently operating in the voice recognition mode.

After the user ends the voice input, the user may perform an input of selecting the slide key provided on the terminal 100 in order to turn off the microphone again as illustrated in image 703. The terminal 100 may maintain a press on the side key for a predetermined amount of time in the turn-on state of the microphone. The terminal 100 then determines that an input event of the key input unit is an input predetermined for controlling the turn-on state of the microphone to be the turn-off state, and controls turn-on state of the microphone to be the turn-off state. The terminal 100 may execute the voice recognition function based on the voice signal of the user collected in the turn-on state of the microphone.

Figure 8:
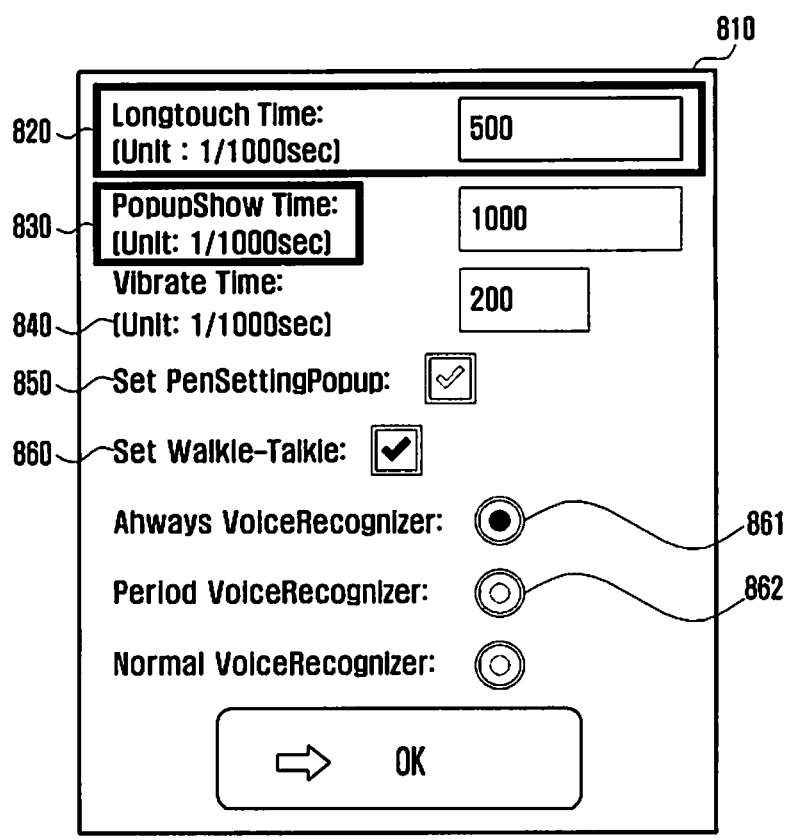
FIG. 8 is a diagram illustrating an example of a microphone operation control setting screen image according to an embodiment of the present invention.

FIG. 8 is a diagram illustrating an example of a microphone operation control setting screen image.

Referring to FIG. 8, the terminal 100 of the present invention supports the turn-on/turn-off state of the microphone to be controlled by a user input. The terminal 100 may differently set a user input motion instructing the turn-on/turn-off state of the microphone for each app supporting the voice recognition function. The user input motion instructing the turn-on/turn-off state of the microphone may be differently set according to the user's setting or under the control of the controller.

For example, when the user input motion is differently set by the user's setting, the terminal 100 support the user input motion instructing the turn-on/turn-off state of the microphone to be set in a setting menu of the app supporting the voice recognition mode. Alternatively, the terminal 100 may differently set the user input motion by determining a characteristic of the app supporting the voice recognition mode.

The display unit may display a microphone operation control setting screen image under the control of the controller. As illustrated in FIG. 8, the microphone operation control setting screen image includes setting items, such as a long touch time setting item 820, a pop-up display time setting item 830, a vibration setting time item 840, a touch pen setting item 850, and a voice recognition setting item 860. The user may set the user input instructing the turn-on/turn-off state of the microphone through the microphone operation control setting screen image.

For example, the user input motion according to the embodiment of FIG. 3 may correspond to a check of the voice recognition setting item 860.

As another example, the user input motion according to the embodiment of FIG. 4 may correspond to selection of a period voice recognizer item 862. When the period voice recognizer item is selected by the user input, the display may output an item for setting a time, for which the microphone is maintained in the turn-on state, and the user may set an operation maintenance time of the microphone through the item for setting the time. The terminal 100 may then maintain the turn-on of the microphone for a time set by the user and collect a voice of the user, and when the set time elapses, the terminal 100 may control the microphone to be turned off.

As yet another example, the user input motion according to the embodiments of FIGS. 5 and 6 corresponds to the case where the long touch time setting item 820 is set or the touch pen setting item 850 is checked.

As described above, the terminal 100 may support the user input motion instructing the turn-on/turn-off of the microphone to be differently set by the user's setting. The terminal 100 may set the user input motion to be applied to all of the cases where the app supporting the voice recognition function is executed, and may differently set the user input motion instructing the turn-on/turn-off of the microphone for each app according to a characteristic of an app. For example, in the case of a memo app, the user may set the microphone to be turned on in response to a long touch event of the touch pen, and in the case of a navigation app, the user may set the microphone to be operated by touching or tapping a predetermined icon.

The aforementioned method and apparatus for controlling a voice input according to the present invention may be implemented with a program command executable through various computers, and recorded in a computer readable recording medium. Here, the recording medium may include a program command, a data file, a data structure, etc. The program command may be specially designed and configured for the present invention or may be used after being known to those skilled in computer software fields. The recording medium may include magnetic media such as a hard disk, a floppy disk and a magnetic tape, optical media such as a Compact Disc Read-Only Memory (CD-ROM) and a Digital Versatile Disc (DVD), magneto-optical media such as a floptical disk, and hardware such as a Read-Only Memory (ROM), a Random Access Memory (RAM) and a flash memory. Further, the program command may include a high level language executed by a computer by using an interpreter as well as a machine language code made by a compiler. The hardware devices may be configured to operate as one or more software modules to realize the present invention.

In the above description, the method and the apparatus for controlling a voice input according to the present invention has been described based on the embodiments through the present specification and drawings, and the specific terms are used, but are used as the general means for easily describing technical contents of the present invention and helping understanding of the invention, and the present invention is not limited to the aforementioned embodiment of the present invention. That is, it is apparent to those having ordinary knowledge in the technical field, to which the present invention pertains, that various embodiments which are based on the technical spirit of the present invention may be implemented. It will be understood by those skilled in the art that various changes in form and details may be made therein without departing from the spirit and scope of the invention as defined by the appended claims and their equivalents.

What is claimed is:

1. A method of controlling a voice input of a terminal supporting a voice recognition function, the method comprising:
controlling a microphone to be in a turn-off state during an operation of a voice recognition mode;
detecting a first user input for requesting turn-on of the microphone based on at least one of a touch input, a touch pen input, and a key input;
controlling the microphone in the turn-off state to be in a turn-on state when the first user input is detected;

collecting voice input data of a user through the microphone in the turn-on state; and controlling the microphone in the turn-on state to be in the turn-off state when a second user input for requesting turn-off of the microphone is detected, and terminating collecting the voice input data.

2. The method of claim 1, wherein detecting the first user input comprises:

displaying an execution object supporting a function of controlling the turn-on or the turn-off of the microphone on a display unit, and detecting a signal for selecting the execution object through an input motion predetermined by a user's setting.

3. The method of claim 2, wherein the execution object is graphically processed differently and displayed according to the turn-on state or the turn-off state of the microphone.

4. The method of claim 1, wherein detecting the first user input comprises detecting at least one of a signal of the touch pen input maintained for a time predetermined by a user's setting, a button input signal of a touch pen, a touch input signal, and an input signal of a key input unit predetermined by a user's setting.

5. The method of claim 1, wherein controlling the microphone in the turn-on state to be in the turn-off state comprises controlling the microphone in the turn-on state to be in the turn-off state when an execution of a voice recognition function is detected.

6. The method of claim 5, further comprising:

setting a user input for controlling the turn-on or the turn-off of the microphone before the execution of the voice recognition function.

7. The method of claim 5, further comprising:

executing the voice recognition function based on the collected voice input data after terminating collecting the voice input data.

8. A terminal for supporting a voice recognition function, the terminal comprising:

a display unit configured to display a voice recognition operation screen image, and to display an execution object supporting a function of controlling turn-on and turn-off of a microphone;

an input unit configured to generate at least one of a touch input, a touch pen input, and a key input;

a microphone configured to collect a voice signal; and a controller configured to control the microphone to be in a turn-off state during an operation of a voice recognition mode, to detect a first user input for requesting the turn-on of the microphone based on the at least one of the touch input, the touch pen input, and the key input from the input unit, to control the microphone in the turn-off state to be in a turn-on state when the first user input is detected, to collect voice input data of a user through the microphone in the turn-on state, to control the microphone in the turn-on state to be in the turn-off state when a second user input for requesting the turn-off of the microphone is detected, and to terminate collecting the voice input data.

9. The terminal of claim 8, wherein the controller is configured to detect a signal for selecting the execution object through an input motion predetermined by a user's setting.

10. The terminal of claim 8, wherein the controller is configured to detect at least one of a signal of the touch pen input maintained for a time predetermined by a user's setting, a button input signal of a touch pen, a touch input signal, and an input signal of a key input unit predetermined by a user's setting.

11. The terminal of claim 8, wherein the controller is configured to control the microphone in the turn-on state to be in the turn-off state when an execution of the voice recognition function is detected.

12. The terminal of claim 8, wherein the controller is configured to set a user input motion controlling the turn-on or the turn-off of the microphone according to a user input.

13. The terminal of claim 8, wherein the controller is configured to control the voice recognition function to be executed based on the collected voice input data.

14. The terminal of claim 8, wherein the display unit is configured to graphically process differently and display the execution object according to the turn-on state or the turn-off state of the microphone.

* * * * *